Figure 1:
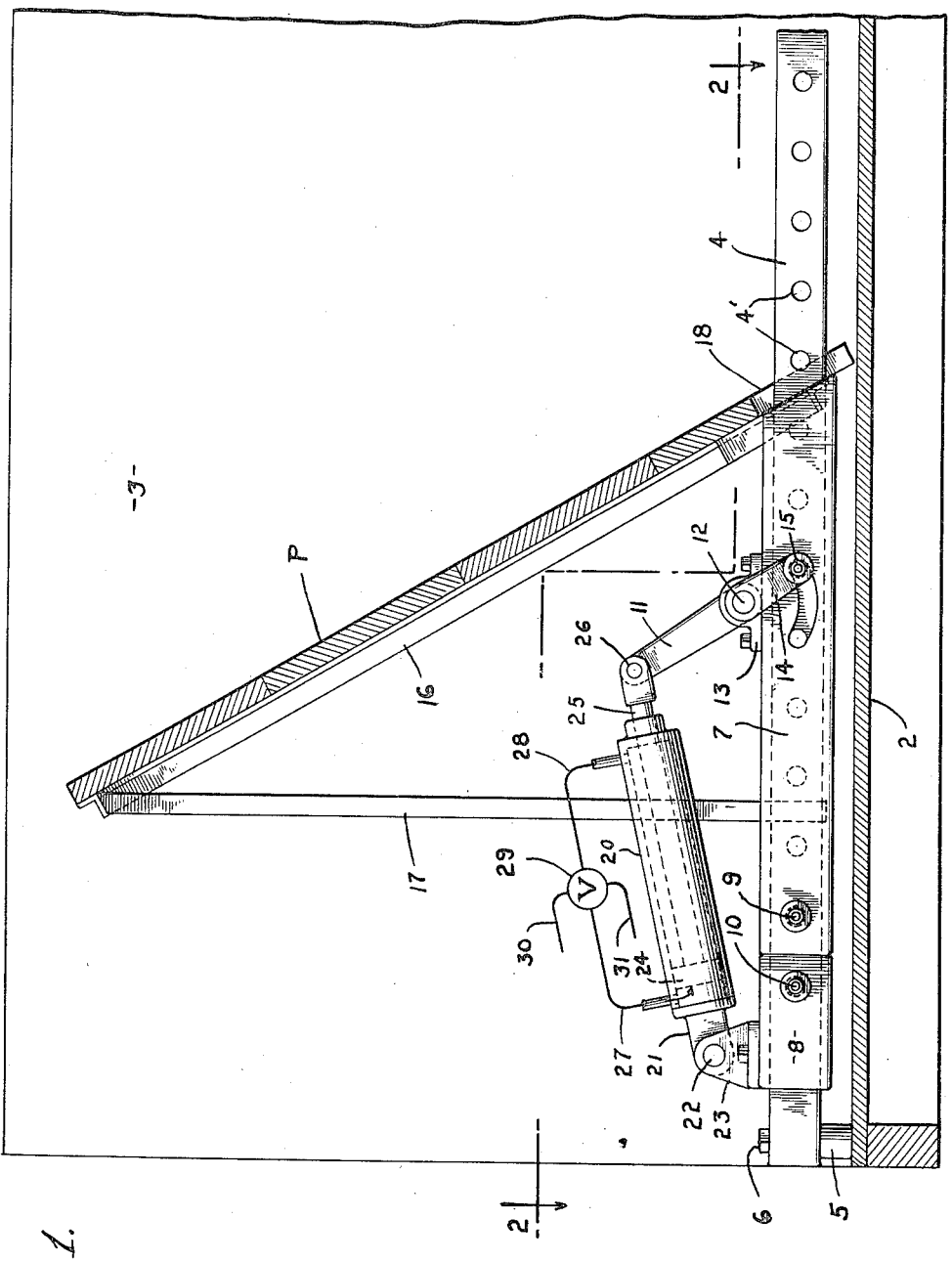

June 28, 1955 J. R. WEST 2,711,836
PUSHER TYPE WAGON UNLOADER
Filed July 23, 1952 2 Sheets-Sheet 2
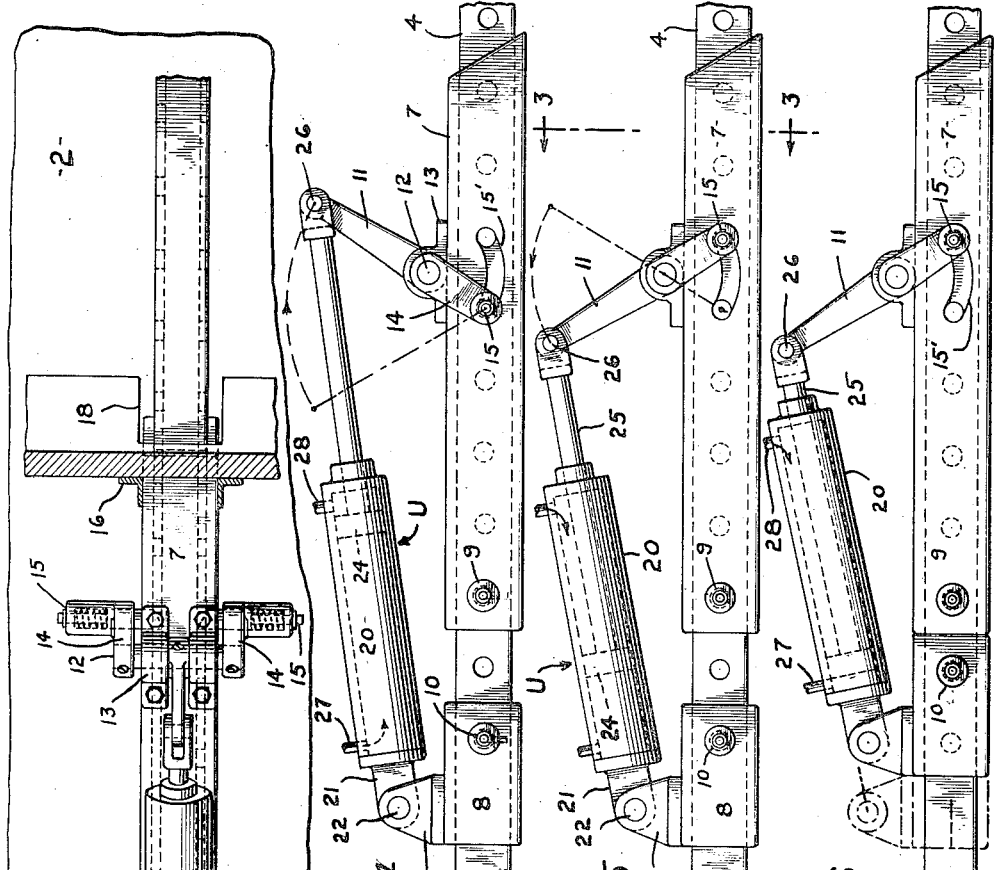
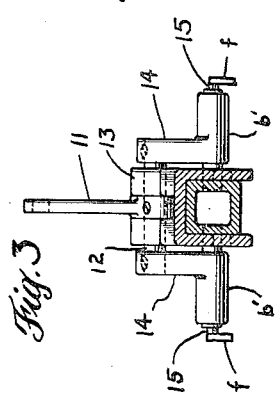
INVENTOR.
James R. West
BY Richard E. Babcock Jr.
Attorney

United States Patent Office 2,711,836
Patented June 28, 1955

2,711,836

PUSHER TYPE WAGON UNLOADER

James Rex West, New Holland, Pa., assignor to The New Holland Machine Division of The Sperry Corporation, New Holland, Pa., a corporation of Delaware Application July 23, 1952, Serial No. 300,397

6 Claims. (Cl. 214—82)

This invention relates to a wagon or truck unloader of the class in which a pusher is moved lengthwise through the body of a vehicle to expel its contents through one end.

It has heretofore been proposed to propel a pusher or movable end gate through a wagon body in step by step intermittent movement, such as may be produced by a hydraulic jack or power unit, preferably of the double acting type supplied as standard equipment on farm tractors. This was accomplished by mounting the pusher on one of a pair of slides which were guided on a track for movement lengthwise of the wagon, the track and each of the slides having cooperating ratchet means permitting movement of the slides in only one direction, and a hydraulic unit being connected between these slides to alternately urge them apart and draw them together so that they would move in step by step progression along the wagon body.

In actual practice it was found that with such arrangement the power supplied through a usual standard tractor hydraulic unit and actuated from the fluid pump of the tractor was not always adequate to discharge heavy loads of compressible material such as corn silage. However, to employ a special heavy duty unit for this particular purpose would be undesirable inasmuch as it would necessitate an extra outlay of expense on the part of the farmer whose tractor would in most cases already be equipped with the standard type of unit.

It is accordingly a primary object of the invention to provide a wagon unloader of the type aforementioned which incorporates a simple power multiplying or increasing mechanism capable of materially increasing the force transmitted by the hydraulic unit and thus making practical under all conditions the use of a standard hydraulic tractor unit as the actuating means for such a wagon unloader.

Also, in the prior machines of the type under consideration no means existed for applying the hydraulic force in a manner to return the pusher to its starting point after it had operated to discharge a load of material. It is, therefore, a further object of the invention to provide a wagon unloader of this type in which the force of the hydraulic unit may be applied selectively, either to advance or retract the movable pusher or end gate.

A further important object is to provide a novel interconnection between the several parts whereby during each unloading stroke of the pusher same will be subjected to a continuous rocking movement tending to concentrate the major force of its unloading thrust against successive portions or strata of the load to better break loose any binding frictional engagement between the load and the wagon body.

The foregoing primary objects and advantages as well as other incidental objects and advantages are all attained through the preferred embodiment of the invention hereinafter described and illustrated in the accompanying drawings, in which:

Figure 1 represents a fragmentary section elevation view of a wagon unloader in its position of starting unloading, the wagon box or body being illustrated fragmentarily;

Figure 2, a fragmentary plan section taken on the line 2—2 of Figure 1;

Figure 3, a cross-section taken on the line 3—3 of Figure 5;

Figure 4, a fragmentary view showing the mechanism with the piston of the actuating cylinder at its first forward stroke of unloading;

Figure 5, a similar view showing the mechanism with its piston in its first portion of its rearward stroke for positioning the mechanism in readiness for forward movement of the cylinder; and, Figure 6, a similar view showing the mechanism with the cylinder brought forward in readiness for the next unloading or advance stroke of the piston.

Referring now in detail to the accompanying drawings, and first considering Figures 1 and 2, the load carrying vehicle body therein illustrated preferably represents the body or box of a usual tractor towed farm wagon though it may also represent the load carrying body of a truck or other vehicle. Such a body comprises a usual horizontal floor 2 and opposed vertical sides 3, of which only 1 is indicated in Figure 1. However, the arrangement is entirely conventional and will be readily understood by those skilled in the art to which the present invention appertains.

Extending lengthwise of the wagon box or body is a guide rail or track 4 which also functions as a ratchet bar and to this end is provided with suitable ratchet means which in the present embodiment assume the form of series of uniformly spaced circular perforations 4' extending horizontally through it opposite sides. The illustrated track is of tubular metal or other rigid construction of rectangular cross-section and is supported at its opposite ends, as by means of the spacers and bolts 5 and 6 respectively in Figure 1 in spaced parallel relation above the bottom 2 of the wagon box or body.

Guided for movement along the track 4 are a pair of slides 7 and 8 respectively, ratchet means 9 and 10 being carried by the respective slides 7 and 8 for operative engagement with the track 4 to restrict the two slides to movement in the same direction and to interlock with the track 4 to prevent movement in the other direction. Preferably the two ratchet means or elements 9 and 10 are reversible, or in other words may be set to prevent movement of their respective slides in either direction along the track 4, to the end that the hydraulic means hereinafter described may be utilized to move these slides toward either end of the wagon box or body. The illustrated exemplifications of such ratchet means are similar. As best shown in Figure 2, each such means comprises a cylindrical pin $a$ guided for movement in a cylindrical sleeve $b$ threaded into an opening in the side of its respective slide, and resiliently projected from the sleeve for interlocking reception in the perforations 4' in the arm 4, by means of a spring $c$ under compression between each pin $a$ or plunger $a$ and the rear end of its respective sleeve or housing $b$. Each such plunger has a sloping or cammed end face $d$ adapted to engage the adjacent edge of its respective perforation 4' and ride out of same during movement of the sleeve in one direction, but arranged so that the longer side of the plunger positively abuts against the periphery of the perforation 4' to prevent movement of its respective slide in the reverse direction.

In Figure 2, both of the ratchet means or elements 9 and 10 are set to permit only unloading or advance movement of their respective slides. In order that these ratchet elements may be reversed to permit retraction of their respective slides following an unloading movement, same are provided with rearwardly projecting stems $e$ equipped with manually operable handles *f* by means of which the cylindrical plungers or pins *a* may be easily rotated about their axes through 180° to reverse their operative positions whenever desired.

While the slide 8 may advantageously be in the form of a sleeve surounding and conforming in cross-section to the track 4, the slide 7 is in the form of a downwardly opening channeled member, as best shown in Figures 3, so that the slide 7 will be free to raise or tilt vertically relative to the track 4.

Medially fulcrumed on the slide 7 is an operating lever having an upwardly projecting arm 11 rigidly connected to the fulcrum pin 12 which is journalled in bearings 13 on sleeve 7. Fixed to the ends of the pin 12 and depending on opposite sides of the slide 7 are depending rigid legs 14—14, as best illustrated in Figure 3. Each of these depending lever legs 14 carries a pawl or ratchet means 15 at its lower end for operative engagement with the ratchet means or perforations 4' of the track 4. Each of the ratchet or pawl means 15 may be similar in all respects to the ratchet or pawl means 9 and 10 heretofore described, the only difference being that in the instant embodiment the sleeves or housings *b'* of the pawls 15 are integral with their respective lever legs 14. It will be understood that these pawls 15 are reversible through actuation of their control handles *f* in the same manner as pawls or ratchet means 9 and 10.

Connected to the slide 7 for movement therewith lengthwise of the wagon body, is a pusher or false end gate, generally designated P. Preferably the pusher P is actually carried by the slide 7, and to this end the pusher P in the exemplification illustrated comprises a plurality of boards supported across a substantially rectangular frame 16 as shown in Figures 1 and 2, the frame 16 being welded or otherwise rigidly connected to the slide 7. It is desirable also, to brace the upper end or edge of the frame, by means of rigid braces 17 connected to the slide 7. It will be understood that the shape of the pusher P is such as to extend across and completely occupy the entire cross-sectional shape of the wagon box. However, sufficient clearance is permitted to avoid any interference with the lengthwise movement of the pusher P through the wagon box. It will be noted that the lower edge of the pusher P is notched, as at 18 so that it may fit around the track 4.

Connected between the operating lever 11 and the slide 8 for the purpose, of oscillating the lever arm 11, and its associated lever portions 14, is an extensible and retractable actuating means which may conveniently comprise a usual and conventional hydraulic cylinder and piston unit, generally designated U, which comes as standard equipment with various makes of present day farm tractors.

Such a unit comprises a usual hydraulic cylinder 20 having a coupling fitting 21 at its rear or closed end pivotally connected by pin 22 to clevis 23 fixed on the slide 8. Reciprocably disposed in the cylinder is a piston 24, the piston rod 25 of which is pivotally connected as at 26 to the free upper end of the lever arm 11.

Operating fluid is introduced into or exhausted from opposite ends of the cylinder 20 through conduits 27 and 28 respectively communicating with the opposite cylinder ends. As indicated diagrammatically in Figure 1, both of these conduits 27 and 28 are connected to a suitable reversing valve 29 which may be selectively positioned to receive fluid under pressure from a suitable pump on the tractor or elsewhere, through either of the conduits 30 or 31. Preferably the valve 29 is of a conventional type which automatically reverses at predetermined intervals to reverse the direction of fluid flow through the respective conduits 27 and 28, to thus reciprocate the piston 24 back and forth within the cylinder 20. However, if desired, the valve 29 may be of the manually controlled type.

In the operation of the mechanism above described, the two slides 7, 8 and the pusher P are initially positioned as closely as possible to the forward end of the wagon box as in Figure 1, while the wagon is loaded with material rearwardly of the pusher P and on the opposite side thereof from the slides 7 and 8.

In order to discharge the material by ejecting it longitudinally through the rear end of the wagon, the pawls 9 and 10 of both slides and also the pawls 15 of the lever legs 14, are all set as shown in Figure 2 to permit movement of their respective slides and lever legs only in a rearward or unloading direction. Such setting of the pawls may be accomplished through manual rotary movement of their respective operating or control handles *f*.

At this time the piston and piston rod will be fully retracted into the cylinder 20. Thereupon the valve 29 is actuated to cause the fluid pressure to cause an outward stroke of the piston 24 and a consequent extension of the unit U. During this extension stroke rearward movement of the piston 20 is prevented by interengagement between the pawl 10 and the track 4, while the lever 11 is swung about the pivotal connections defined by the pawls 15 received in the perforations 4' of the track 4. This will cause unloading movement of the pusher P and its slide 7 for the distance shown in Figure 4, causing the pawl 9 to ride out of one notch or perforation 4' and into the next succeeding perforation 4' along the track 4. Thereupon reversal of the piston movement and consequent retraction of the extensible unit U causes a return swing of the lever 11 which serves to retract the pawl 15 from one perforation 4' and advance it in an unloading direction to the next adjacent perforation 4' until it snaps thereinto and operatively engages the periphery of said perforation preparatory to the next unloading stroke.

During such reverse or retraction movement of the piston 24, the return movement of the lever 11 will generally occur during the first portion of the piston return stroke, as in Figure 5 and after this, as shown in Figure 6 the completion of the return piston stroke will serve to draw the cylinder 20 and its associated slide 8 forwardly, removing the pawl 10 from one perforation 4' and dropping it into the next perforation 4' preparatory to the next unloading stroke, at which time the several parts will be in their relative positions shown in Figure 6. Thus, successive reciprocations of the piston will actuate the lever 11 and slides 7 and 8 to produce an intermittent progression of the pusher P toward the rear end of the wagon box and to expel the wagon contents through said rear end.

After the pusher P has traveled the length of the wagon and completed the expulsion of material therefrom, it may be returned to its starting point simply by rotating the operating or control handles *f* of the respective pawls 9, 10, and 15—15 through 180° to thus reverse the several pawls 9, 10, 15—15 to permit return movement of their respective slides and lever portions.

It will be readily apparent that the relative lengths of the lever arm 11 and depending legs 14—14 may be so chosen that the actuating force of the unit U may be transmitted to the slide 7 with a considerable mechanical advantage.

During the movement of the lever arm 11 from the position of Figure 6 to the position of Figure 4 to accomplish an unloading stroke of the pusher P it will be seen that the pivotal connection 12 of the lever to the sleeve 7 will be swung through an arc concentric to the pivotal connection defined by the pawls 15 at their point of engagement with the track 4. During the first half of the swinging movement this will cause an upward tilting or rocking of the slide 7 about its rear end, with a consequent rearward rocking or tilting of the pusher P to thereby initiate movement of the wagon contents progressively from the bottom upwards and thereby gradually break the frictional grip between the wagon contents and the wagon box. During the latter portion of the stroke after such frictional grip has been broken it will be seen that the pivot 12 moves through a descending arc, causing a gradual return of the pusher P to its initial angle of inclination. By such tilting or wabbling of the pusher P during its expulsion stroke it will be seen that the pusher P tends to concentrate the major portion of its thrust against the wagon contents at levels or strata which vary progressively from bottom to top and vice versa during the course of each stroke, thereby achieving an improved and highly efficient action in breaking loose the frictional grip or engagement between the wagon contents and the wagon body.

Having thus described my invention, I claim:

1. In a wagon box unloader, the combination comprising a track extending lengthwise of the wagon box, a pair of slides guided for movement along said track, cooperating ratchet means carried by said track and the respective slides to prevent return movement of said slides while permitting independent advance movement thereof, a lever medially pivotally mounted on said first slide, a pawl carried at one end of said lever for operative engagement with the ratchet means of said track, said pawl being disposed for advance movement along said track and for interlocking engagement with the ratchet means thereof against return movement, a double acting hydraulic jack pivotally connected to the second of said slides and to the other end of the said lever, and operative to oscillate said lever about its medial pivotal mounting, whereby on advance movement of said lever the first said slide will be advanced while the other said slide remains stationary to provide a positive abutment for the said jack, and on the return movement of said lever the first said slide remains stationary while the other said slide is drawn up to it in preparation for a further advance movement of the first slide.

2. In a wagon unloader, a track extending lengthwise of said box, a pair of slides guided for movement along said track, said slides having similarly disposed spring loaded pawls adapted for reception in uniformly spaced recesses in said track to prevent retrogressive movement of the slides along the track, a lever fulcrumed on one said slide, extensible and retractible power means operatively connected between said lever and said other slide to alternately swing said lever in opposite directions about its fulcrum, and pawl means carried by said lever for interlocking reception in successive recesses in said track as the lever is successively swung in a direction to advance said one slide along said track.

3. In a wagon unloader of the class in which a pusher is moved lengthwise of a wagon body to expel the contents thereof, a track extending lengthwise of the wagon body, a slide guided for movement along said track and rockable on said track in the direction of its movement, the pusher being rigidly connected to said slide for movement therewith, cooperating ratchet means carried by said track and said slide to prevent retrogressive movement of the slide, in combination with a lever fulcrumed on said slide, one end of said lever depending adjacent said track and having means connected thereto for interlocking with said track to establish a fixed pivotal connection about which the lever may be swung in a direction to advance said slide and to simultaneously rock said slide and the pusher.

4. The mechanism defined in claim 3, including power means associated with said lever and operative to cause oscillation thereof.

5. In a wagon unloader of the class in which a pusher is moved lengthwise of a wagon box to expel the contents thereof, a track extending lengthwise of said body, a pusher slide guided for movement along said track and rockable on said track in the direction of its movement, the pusher being rigidly connected to said slide for movement therewith, an anchor slide guided for movement along said track, ratchet means on said track and said slides normally disposed to prevent retrogressive movement of said slides, a lever fulcrumed on said pusher slide, and ratchet means carried by said lever and operative normally to establish a fixed pivotal connection of the lever to the track when the lever is swung in a direction to advance said pusher slide along the track, said ratchet means of the lever disengaging the track on the return swing of said lever, all of said ratchet means of the lever and slides being reversible whereby swinging of the lever may cause return movement of the said slides and pusher, and extensible and retractible power means connected between said anchor slide and said lever to swing the latter and to simultaneously rock said slide and the pusher.

6. In a wagon unloader of the class in which a pusher is moved lengthwise of a wagon box to expel the contents thereof, a track extending lengthwise of said body, a pusher slide guided for movement along said track and rockable on said track in the direction of its movement, the pusher being rigidly connected to said slide for movement therewith, an anchor slide guided for movement along said track, ratchet means on said track and said slides normally disposed to prevent retrogressive movement of said slides, a lever fulcrumed on said pusher slide, and ratchet means carried by said lever and operative normally to establish a fixed pivotal connection of the lever to the track when the lever is swung in a direction to advance said pusher slide along the track, said ratchet means of the lever disengaging the track on the return swing of said lever, and extensible and retractible power means connected between said anchor slide and said lever to swing the latter and to simultaneously rock said slide and the pusher.

References Cited in the file of this patent

UNITED STATES PATENTS

| Number | Name | Date |
|---|---|---|
| 1,946,452 | Bridges | Feb. 6, 1934 |
| 1,962,228 | Abramson et al. | June 12, 1934 |
| 2,258,988 | Le Laurin | Oct. 14, 1941 |
| 2,365,771 | Olson | Dec. 26, 1944 |
| 2,512,339 | Knapp, Jr. | June 20, 1950 |
| 2,561,755 | Recker | July 24, 1951 |
| 2,599,741 | Bishman et al. | June 10, 1952 |
| 2,606,677 | Snedeger | Aug. 12, 1952 |
| 2,640,613 | Kuhl | June 2, 1953 |
| 2,657,009 | Neis et al. | Oct. 27, 1953 |